March 9, 1926.

A. L. GENTER 1,575,907

FILTERING AND THICKENING PROCESS AND APPARATUS

Filed April 11, 1921   2 Sheets-Sheet 1

Inventor
Albert L. Genter

By his Attorneys
Pennie, Davis, Marvin & Edmonds.

March 9, 1926.
A. L. GENTER
1,575,907
FILTERING AND THICKENING PROCESS AND APPARATUS
Filed April 11, 1921  2 Sheets-Sheet 2
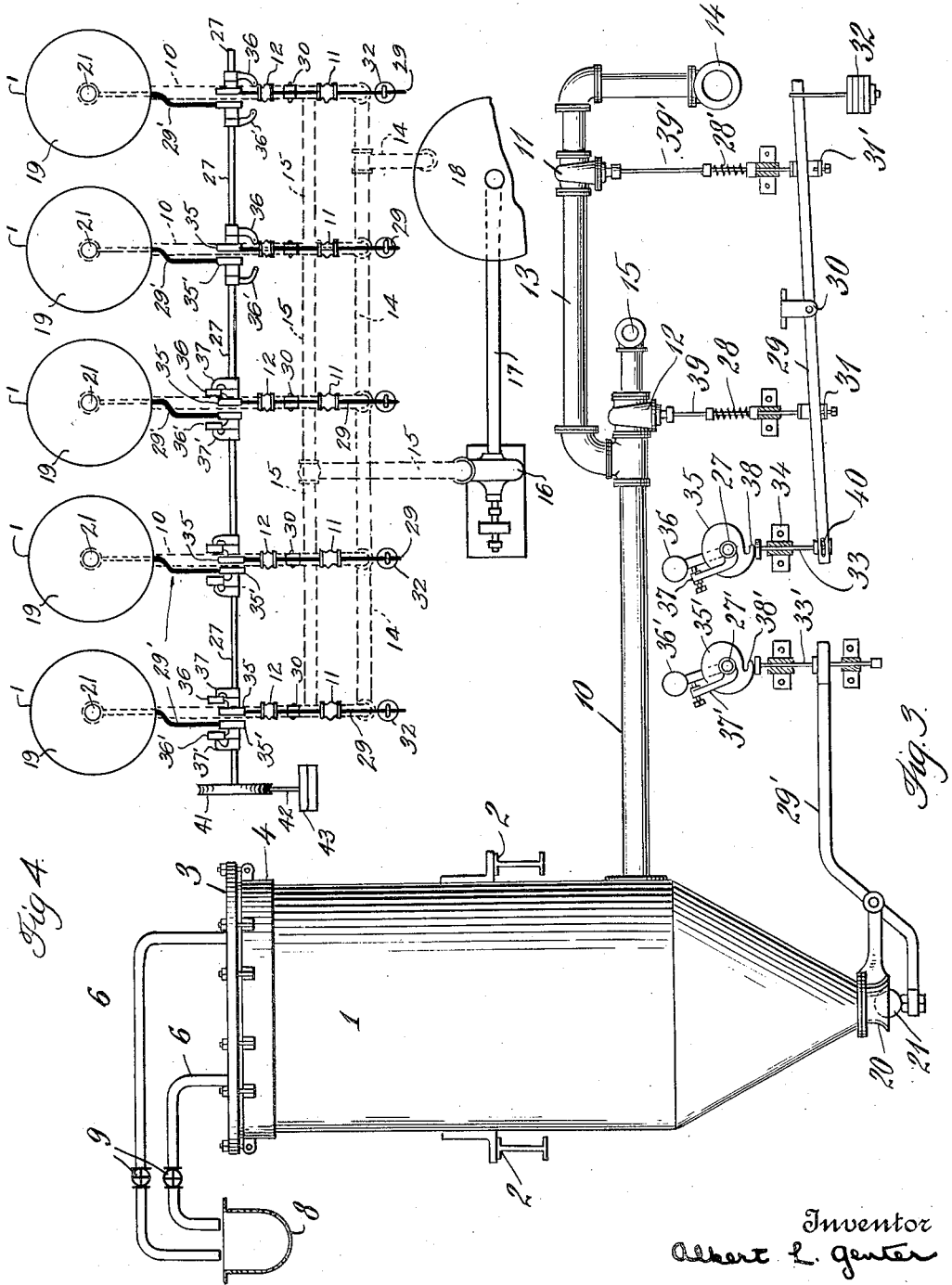

Patented Mar. 9, 1926.

1,575,907

UNITED STATES PATENT OFFICE.

ALBERT LEGRAND GENTER, OF SALT LAKE CITY, UTAH, ASSIGNOR OF ONE-HALF TO THE GENERAL ENGINEERING COMPANY, OF SALT LAKE CITY, UTAH, A CORPORATION OF UTAH.

FILTERING AND THICKENING PROCESS AND APPARATUS.

Application filed April 11, 1921. Serial No. 460,187.

*To all whom it may concern:*

Be it known that I, ALBERT L. GENTER, residing at Salt Lake City, in the county of Salt Lake, State of Utah, have invented certain new and useful Improvements in Filtering and Thickening Processes and Apparatus; and I do hereby declare the following to be a full, clear, and exact description of the invention, such as will enable others skilled in the art to which it appertains to make and use the same.

The present invention relates to a process of filtering and continuously thickening the mixture to be filtered, in which the liquid content of the mixture is to a large extent separated from the solid matter in suspension, and the latter is discharged into the mixture being filtered to thicken it, whereby a thickened material of the consistency of a mud or slime results.

It has long been the practice in industrial filtration to remove cakes from filter media after the filtration has proceeded sufficiently to form cakes of substantial thickness, from which cakes values have been extracted, by forcing water or some other liquid through them, and after the removal of the original mass of unfiltered material away from the cakes, or the cakes from the unfiltered mixture. In all such filtering operations the filters are used to effect as complete a separation of the liquids and solids as possible, and in others the cakes are given a displacement wash, or even dried before their removal from the filter medium; and, in every instance, the removal of the cakes takes place ex situ, or in other words entirely removed from the original bath of unfiltered mixture. The discharge of the cakes from the medium is generally accomplished by sluicing them therefrom with water or air jets, or by the application of air or steam under pressure to the interior of the filter elements, but always in the absence of the unfiltered mixture.

In Letters Patents 1,214,152, 1,263,226 and 1,359,162, granted to me on January 30th, 1917, April 16th, 1918, and November 16th, 1920, respectively, Letters Patent No. 1,452,151, granted to myself and George C. Jones on April 17, 1923, and Letters Patent No. 1,397,095, granted to me on May 25, 1921, I have described the basic principles of, and the steps involved in my process, and its modifications, of filtering and continuously thickening mixtures, with illustrative apparatus for carrying out the process. The process described in these patents and applications consists in filtering the mixture and cleansing the filter medium in situ by a reverse flow or countercurrent of filtrate through the pores of the medium which discharges the filter cake from the medium and into the mixture being filtered to thicken the latter.

The filtration proceeds by intermittent pulsations under pressure, and alternately therewith the reverse flow or countercurrent of filtrate occurs under positive pressure, such as compressed air or steam acting on a reservoir of filtrate, or by the hydrostatic head of a relatively long filtrate column, which, as stated, takes place in alternation with the filtrate-producing flow. The change from the filtering operation to the countercurrent cleansing action may occur at relatively frequent intervals or in any desired succession depending upon the regulating means employed.

As above pointed out it has been the general practice not to remove filter cakes from filter media until cakes of substantial thickness are formed and then the discharge of the cake is effected in the absence of the original bath of unfiltered mixture. Heretofore leaf-type filters have in some instances been equipped with means for holding the filter cake in place on the filter medium while in course of their formation and until they acquire a substantial thickness. Such means are illustrated and described, for example, in Letters Patent 957,467, granted to D. J. Kelly.

In the process constituting the present invention the reverse flow or countercurrent of filtrate is induced by the movement of the mixture to be filtered contained in the filter chamber on one side of the filter elements. As in my earlier patents and applications, the process herein is one of filtering and thickening the mixture being filtered within a container and, like my earlier process and its modifications, the mixture being filtered is not completely separated into its liquid and solid constituents. Thus the results obtained by my process differ from prior filtration processes in the feature, among others, that instead of allowing the filter cake to assume a substantial thickness before its discharge, the accumulated solids or cakes are removed from the filter media at frequent intervals without opening the pressure chamber, and in accordance with the present process without the application of a separate countercurrent of filtrate under positive pressure as described in my previous patents and applications. This makes possible the conversion of a number of present forms of leaf-type filters into apparatus suitable for carrying out the process described herein, and thus the mixture may be filtered and thickened in such leaf-type filters without opening them frequently in order to remove the filter cakes as heretofore. The process results in a practically continuous separation of a large part of the liquid content of the mixture from the suspended solids with which the remainder of the liquid remains to form a thickened mud that accumulates on the filter medium as a cake and is discharged into the mixture being filtered to thicken it. The thickened material or mud thus produced may be further treated in any type of continuous filter in order to reduce the moisture content or remove any values physically or chemically contained therein, if desired.

In the present process the mixture to be filtered is subjected to pressure which acts against one side of the filter medium, intermittently, to force the liquid or filtrate therethrough in one direction. In alternation therewith, the pressure on the same side of the medium is reduced below the pressure on the opposite side thereof by lowering, preferably by gravity, the level of the mixture in the container. A differential pressure is thus set up from the inside to the outside of the filter element to produce a flow in the reverse direction, through the filter medium, of the filtrate, which sluices or dislodges the filter cakes from the surface of the filter medium and into the mixture to thicken the latter. Where the mixture being filtered is under a positive pressure, this pressure is intermittently released and the hydrostatic pressure of the mixture on its side of the medium is reduced below the pressure on the other side thereof as by withdrawing a portion of the mixture from the lower part of the container, thus producing a cleansing flow of filtrate through the medium in alternation with the release of positive pressure. Furthermore, where the filtrate is under a hydrostatic head resulting, as for example, through its being contained in a column above the filter chamber, the pressure of the mixture on one side of the medium is reduced below the hydrostatic pressure of the filtrate on the other side thereof to cause a reverse flow or countercurrent cleansing action of the filtrate.

It will therefore be understood that according to the present process the mixture to be filtered is subjected while in contact with a filtering medium to a filtering action in the course of which the liquid passing through the medium forms a filtrate column. The filtering action is periodically interrupted and the level of the mixture being filtered is lowered with respect to the level of the filtrate in the filtrate column by producing a downward movement of the greater portion of the mixture which is above the bottom of the filtrate column. In this way there is produced a reverse flow of the filtrate through the filtering medium which discharges the solids that have accumulated on the medium during the filtering period into the mixture so that the mixture is thereby thickened.

The process may be carried out in a container in which the filtrate side of the filter medium is connected to the atmosphere, in which case the pressure of the mixture is reduced, in the manner above stated, below atmospheric pressure to cause the reverse flow of filtrate, induced by the creation of a partial vacuum in the container and the suction action resulting therefrom. The withdrawal of a portion of the mixture may be automatically regulated in an apparatus such for example as that illustrated in Fig. 3, and where the apparatus includes a reservoir for the mixture to be filtered, the unfiltered material may be withdrawn from the container into the reservoir to continuously thicken or concentrate the mixture therein.

The invention further comprehends the arrangement of a series of filter units in the form of a battery for continuously filtering and thickening the mixture to be filtered in accordance with the process constituting the present invention. In accordance with such an arrangement, the mixture to be filtered is forced through the filter medium in one direction, in one or more of the filter units, under pressure. Simultaneously therewith, the pressure on one side of the filter media in the remainder of the units is reduced below that on the other side or filtrate side thereof, by lowering the level of the mixture in said units as heretofore described, and the reduction of the pressure of the mixture may be carried out by hand manipulation of valves, for example, or by automatic regulation.

In the accompanying drawings, illustrating various arrangements for converting leaf-type filters, as examples, into apparatus for carrying out my process.

Figure 3 is a view in elevation of an apparatus similar to that illustrated in Figure 1, in which the filtering and thickening operations proceed continuously by automatic regulation.

Figure 4 is a plan view of an apparatus similar to Figure 2 containing a battery of filtering units in which power driven mechanism is included for actuating valves similar to those shown in Figure 3 for the purpose of automatically controlling the operation of all of the units of the battery.

Figure 1:
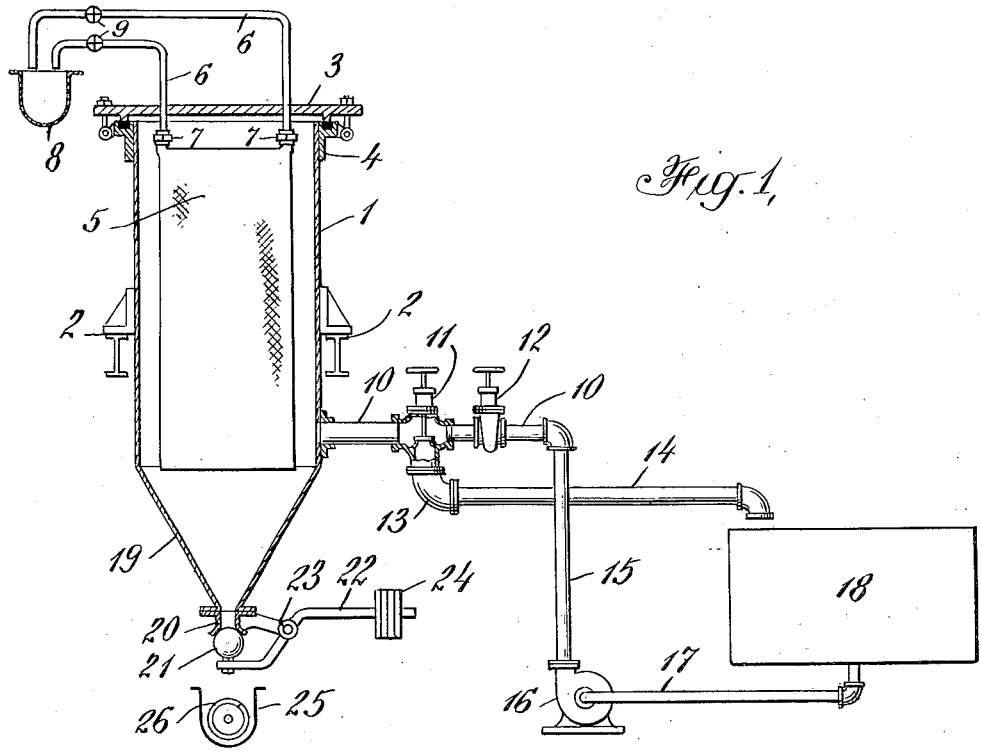
Figure 1 is a view in section and elevation of a form of leaf-type filter, in which a single filter unit is shown, with the addition of mechanisms and connections for filtering and continuously thickening the mixture to be filtered, in accordance with the process herein described.

The filter unit consists of a chamber 1 supported as at 2, and having a leak proof head 3 firmly secured, by any suitable means, to a ring 4 at the upper end of the chamber. Depending from the head 3 are filter elements 5, which are covered by a filter medium in the usual way. Connecting the interior of the filter elements with the atmosphere, and opening into a collecting launder or trough 8, are pipes 6, which are secured to the filter elements 5 by means of unions 7. Each of the pipes 6 is provided with a valve 9 for a purpose hereinafter stated. Connected to the lower portion of the chamber 1 is a feed and drain pipe 10 having therein valves 11 and 12. The pipe 10 has connection through the valve 11 and pipe or fitting 13 with a pipe 14 opening into a reservoir or container 18 for the mixture to be filtered. Also connected to the pipe 10, through a pipe 15, is a pump 16, here shown as a centrifugal pump. The inlet to the pump is connected by means of a pipe 17 with the bottom of the reservoir 18. The valve 12 is positioned in pipe 10 between the valve 11 and the pipe 15 and controls the flow of the mixture to be filtered from the reservoir, and through the pump and pipe lines 17, 15 and 10 into the chamber 1. The chamber 1 has a conical bottom portion 19 which acts as a hopper for collecting the thickened material, with an outlet consisting of a spigot 20 closed by a ball valve 21. The valve is mounted on the end of a lever 22 pivoted as at 23 to a bracket secured to the conical portion 19, and having a weight 24 at the outer end thereof. Referring to Figure 1, the operation is as follows:

Assuming the chamber 1 to be filled with unfiltered material supplied by the pump 16 from the reservoir 18 through pipe lines 17, 15 and 10; valve 12 being open, and valve 11, controlling the flow through pipe lines 13 and 14 being closed, the pressure of the pump causes a clear liquid filtrate to flow through the medium on the filter elements 5. The column of filtrate rises within the filter elements 5 and thence through connections 7 and pipes 6 and is discharged into the collecting launder or trough 8, from which the filtrate is conducted by any suitable means. After a period of time, which varies according to the nature of the material being separated by filtration, the valve 12 is closed and the valve 11 opened, thus cutting off the feed of unfiltered material to the filter units and permitting the mixture to be filtered contained in chamber 1, and surrounding the filter elements 5, to drain back through the valve 11 and connections 13 and 14 to the reservoir 18. For this purpose the pipe 10 is connected to the lower part of chamber 1 and preferably at or near the bottom of filter elements 5. Hence when valve 12 is closed and valve 11 opened a substantial quantity of the mixture quickly rushes out from chamber 1 under the head of the mixture within this chamber. This lowers the level of the mixture within chamber 1 with respect to the level of the filtrate of the filtrate column within filter elements 5. As the result of this difference in head there is an out-flow of the filtrate from the filtrate columns through the filter medium which discharges the solids which have accumulated on the medium into the mixture and thickens the same. The sudden withdrawal of mixture from the lower part of the chamber 1 also creates a partial vacuum within the chamber and within the filter elements.

The filtrate outlet pipes 6, attached to the filter elements 5 being normally open to the atmosphere, the creation of a partial vacuum in chamber 1, and in the filter elements, results in a flow of air through pipes 6 to the interior of the filter elements, and out through the filter medium into the chamber 1, together with whatever filtrate is contained within the filter elements. The withdrawal of the mixture from the chamber 1 occurs relatively suddenly, and the suction action resulting therefrom produces a reverse flow of the filtrate through the filter medium, by which the intercepted solids on the surface of the medium, forming the filter cake, are sluiced or dislodged therefrom and fall to the conical bottom 19 of the chamber. Where it is not deemed advisable to suck air into the interior of the filter elements with the filtrate, during this action, a filtrate chamber, or long filtrate storage pipes may be connected with pipes 6. Then during the reverse flow of the filtrate nothing but the filtrate passes through the filter medium. Such connections are not illustrated but will be readily understood. It is also quite clear that pipe 10 might be provided with a three-way cock instead of valves 11 and 12, and, while this substitution would simplify the construction and operation, satisfactory results could not be obtained with certain muddy or gritty substances.

It will be understood that in some cases the filter medium may be readily cleansed by the removal of the cake therefrom by the withdrawal of only a small portion of the mixture contained in chamber 1, in which case the necessity of repumping larger quantities of the mixture back into chamber 1 at the beginning of the next cycle of operation would be avoided. When the filter medium has been cleansed by the reverse flow of the filtrate therethrough, caused by the withdrawal of the mixture from the chamber 1 and into the reservoir 18, the valve 11 is closed, valve 12 opened and the cycle is thus repeated at will. When it is desired to empty a quantity of the thickened material from the chamber, lever 22 is raised, thus opening the ball valve 21 and the thickened material, which is in the form of mud or slime, flows by gravity or under pressure to a suitable conveyor 25, 26.

When, as in some instances, the quantity of thickened material in the chamber 1, resulting from one filtration period, is sufficiently large, the outrush of this material from the chamber, when the spigot valve 21 is opened and the valve 12 closed, will be such as to cause a sufficient lowering of the level of the material in the container to produce the required suction action and induce a reverse flow of the filtrate sufficient to effect the cleansing action. Such action would, of course, dispense with the necessity of valve 11 and its connections 13 and 14, for it is evident that after closing valve 12, the suction action within the container may be produced as well by draining the thickened material from the chamber through the spigot, as by draining a relatively thinner mixture through valve 11, and thus the construction of the apparatus is simplified.

Figure 2:
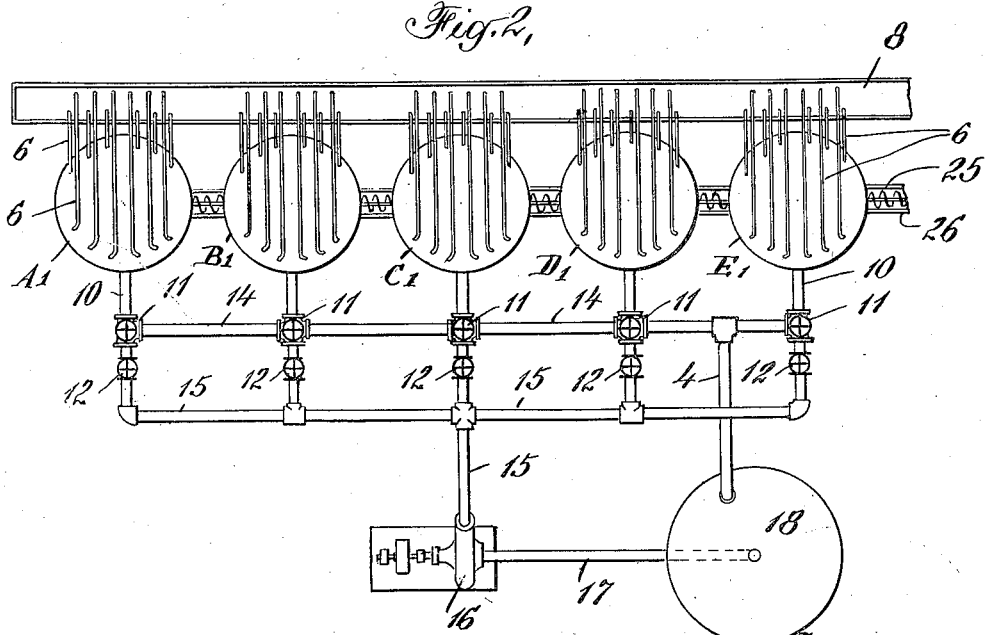
Figure 2 is a plan view of an apparatus containing a battery of filter units for continuously carrying out the filtering operation in one or more of the units, while continuously thickening the mixture to be filtered in the remainder thereof, in accordance with the process herein described.

The method of cleansing the filter medium by the removal of the cake therefrom and separation of a large portion of clear liquid from a small portion of thickened material becomes practically continuous when one pump and one reservoir is used to supply a battery or series of filtering units such as are illustrated in Fig. 2. Here the pump 16 draws unfiltered material from the reservoir 18 and supplies it to any desired chamber by means of feed manifold 15 and branches 10 to the chamber, through the valves 12 and 11. For example, if the elements in chamber $A^1$ are being cleansed by the flushing action of the filtrate to dislodge the filter cake, the valve 12 controlling the flow of the mixture to be filtered to this chamber is closed, and filtration proceeds in the remainder of the chambers $B^1$, $C^1$, $D^1$ and $E^1$, the valve 11, controlling the flow of thickened material from the chamber $A^1$, through pipe line 10 and 14, to the reservoir being open.

Valves 11 and 12 are then closed and opened respectively and similar valves controlling the flow to and from chamber $B^1$ are manipulated in the same way to bring about the cleansing action in this chamber, while filtration proceeds in $A^1$, $C^1$, $D^1$ and $E^1$, etc. In this manner, filtering and thickening of the mixture proceeds in one or more of the chambers, while the cleansing action takes place in the remainder of the chambers, and vice versa. If the operation of the valves and spigots of the various filter units is made purely mechanical and automatic, as illustrated in Fig. 3, such a battery of two or more units will produce practically a continuous flow of clear liquid in one direction and thickened material in the other with the expenditure of no labor except that of supervision and inspection of the clear filtrate. As before noted, the filtrate pipes 6 are provided with cut-off cocks or valves 9 and their purpose is to stop the flow of filtrate from the filter chamber or chambers into the collecting launder or trough 8 in the event of damage to the filter medium causing a muddy filtrate to issue from the pipes.

In Fig. 3 the pipe 14 opens into a reservoir, and pipe 15 connects the pipe 10 with the outlet of a pump, the inlet end of which is connected by means of a pipe to the bottom of the reservoir as in Fig. 1, this construction being omitted in Fig. 3.

Valves 11 and 12, as well as the spigot valve 21, are mechanically actuated by a timing mechanism composed of cams and tumblers on two shafts 27 and 27', or preferably only one such shaft. The shaft or shafts 27' are continuously rotated slowly in the same direction by any suitable source of power (not shown). Two shafts are shown here for convenience of illustrating the operation of two different sets of valves 11 and 12, on the one hand, and 21 on the other. In practice, the cam mechanisms are installed adjacent each other on one shaft, which may run the full length of a battery of thickening chambers such, for example, as is illustrated in Figure 4 and which will be described later on. Valves 11 and 12 are of the sliding stem type, and are closed by strong springs 28' and 28, respectively. These valves are opened by the action of the walking beam or lever 29, which is pivoted as 30 and works within the open sided guides 31' and 31. In the operation of lever 29 in guides 31' and 31, there is a certain amount of lost motion, so that the springs 28' and 28 will close their respective valves before the lever 29 comes in contact with the lower end of the stem guide to open either valve. Thus one valve is always closed before the other is opened. The outer end of lever 29 is weighted at 32, and the inner end has a sliding connection with stem 33 held in guide 34. The upper end of this stem is held down in the position shown by cam 35, which in turn is connected rigidly to a weight or tumbler 36.

Both the cam and the tumbler 35 and 36 are loosely mounted on the shaft 27 and do not revolve with it unless the arm 37, rigidly attached to the shaft, pushes them as the shaft slowly rotates. During the upward movement of the arm 37, the cam 35 and weight 36 are rotated until the cam tip 38 releases the end of the sliding stem 33. The lever 29 thus released swings on its pivot under the weight 32 and spring 28 pushes upwardly on the rod 39, closing valve 12 before the lever 29 comes in contact with the lower end of guide 31'. The outer end of lever 29 next strikes against the lower end of guide 31' and moves the sliding stem 39' of valve 11 downwardly thus opening this valve and compressing the spring 28'. This action cuts off the pump feed at 12 and opens the drain valve 11, thus permitting the contents of chamber 1 to drain out of the container, as hereinbefore stated. The weight 36 then passes the upright dead center position, falls, and the lever 29 is actuated as before, the valve 11 is closed by spring 28', and at the same time the valve 12 is opened. The weight 32 acts merely to open valve 11. Valve 12 is opened and held open during filtration by cam 35. Thus valve 12 is opened over a long period and valve 11 during a relatively short period.

Now referring to the mechanism actuating lever 29', and the spigot valve 21, during the upward movement of the arm 37', the weight 36' and cam 35' are rotated until the cam tip 38' releases the end of sliding stem 33'. This allows the lever 29' to rise suddenly and open the spigot valve 21, thus permitting the thickened material to flow from the chamber 1. As the arm 37' continues its movement the weight 36' will finally pass slightly beyond its upright vertical position, and it will then be caused by gravity to fall and carry cam 35' with it. In falling, the cam is again forced against the end of stem 33', which action is communicated to lever 29' and results in the closing of the ball valve 21. The weight 36' then maintains the cam 35' in this position by hanging vertically downward where it remains, until the rotating shaft 27', with its pusher arm 37' slowly revolves and again picks up the weight 36' and during its upward motion causes cam 35' to revolve and release rod 33', as before stated.

Figure 4 illustrates a battery of filter units similar to that of Figure 2 except that the valves 11 and 12 thereof are automatically actuated by power driven mechanism. In this figure the supply pipe 15 coming from pump 16 and discharge pipe 14 together with their branches leading to the various filter units have been shown by dotted lines so as to bring out more clearly the mechanism for actuating valves 11 and 12.

The valve controlling mechanism for each of the filter units shown in Figure 4 is exactly the same as that above described in connection with Figure 3 except for the fact that cams 35 and 35' for each filter unit have been mounted upon a single driving shaft 27 which extends the full length of the battery of units as previously indicated. This driving shaft 27 is rotated slowly by means of a worm gear 41. The worm which meshes with this gear is mounted upon shaft 42 which is provided with tight and loose pulleys 43 to provide for the starting and stopping of the valve actuating mechanism.

In the operation of this apparatus the slow rotation of shaft 27 causes the arms 37 and 37' to periodically lift their respective weights 36 and 36' once during each rotation of the shaft. The weights 36 and 36' rotate their respective cams 35 and 35' as above described in connection with Figure 3, cams 35 controlling the actuation of the valve levers 29 and cams 35' controlling the actuation of the discharge valve levers 29'. These levers are shown in Figure 4 in heavy black lines and valves 11 and 12 are placed directly above these levers as is the arrangement in Figure 3. Inasmuch as not all of the various units in the battery will be discharging accumulated solids at the same time the sets of arms 37 and 37' for the respective filtering units are arranged at different angular positions on shaft 27. Consequently the weights 36 and 36' at any given instant will be seen in different positions as shown in Figure 4.

The process of filtering and thickening which constitutes the present invention is extremely simple to carry out because of the simplicity of the method of producing the cleansing current flow, this being accomplished by merely withdrawing a quantity of the mixture to be filtered from the lower part of the container which creates a difference in head between the column of filtrate within the filter element and the mixture on the outside of the element. Furthermore, the process is advantageous for the reason that it requires relatively simple apparatus for causing the counter current flow.

I claim:

1. The process of filtering and thickening a mixture which comprises subjecting the mixture while in contact with a filtering medium to a filtering action in the course of which the liquid passing through the medium forms a filtrate column, and periodically interrupting the filtering action and lowering the level of the mixture being filtered with respect to the level of the filtrate in said column by producing a downward movement of the greater portion of the mixture which is above the bottom of the filtrate column, thereby producing a reverse flow of the filtrate through the filtering medium which discharges the solids accumulated on the medium into the mixture and thickens the same.

2. The process of filtering and thickening a mixture which comprises subjecting the mixture while in contact with a filtering medium to a filtering pressure within a container, the liquid passing through the medium forming a filtrate column, and periodically cutting off the filtering pressure and reducing the pressure on the side of the medium which is in contact with the mixture below the hydrostatic pressure of the filtrate column by quickly withdrawing from the lower part of the container a substantial amount of the mixture, thereby producing a reverse flow of the filtrate through the filtering medium which discharges the solids accumulated on the medium into the mixture and thickens the same.

3. Apparatus for filtering and thickening mixtures comprising, a container for the mixture having a filter medium therein, mechanically operated means for intermittently connecting the container to a source of filtration pressure which acts against one side of the filter medium to force the liquid therethrough in one direction, and mechanically operated means acting alternately with said first mentioned means for effecting the quick withdrawal of a substantial portion of the mixture from the lower part of the container so as to lower the level of the mixture in the container with respect to the level of the filtrate on the other side of the filter medium and thereby to produce a flow of filtrate through the medium in the reverse direction which discharges the accumulated solids from the surface of the filter medium into the mixture and thickens the same.

4. The process of filtering and continuously thickening a mixture in a system containing a filtering unit and a reservoir for the mixture to be filtered which comprises subjecting the mixture while in contact with a filtering medium within the filter unit to a filtering pressure, the liquid passing through the medium forming a filtrate column, and periodically cutting off the filtering pressure and reducing the pressure on the side of the medium which is in contact with the mixture below the pressure of the filtrate column by quickly withdrawing a substantial amount of the mixture from the lower part of the filter unit and into the reservoir, thereby producing a reverse flow of the filtrate through the filtering medium which discharges the solids accumulated on the medium into the mixture and thickens the same and the mixture in the reservoir.

5. The process of filtering and continuously thickening a mixture in a system including a plurality of filter units which comprises subjecting the mixture in one group of said units while in contact with the filtering media thereof to a filtering action in the course of which the liquid passing through each medium forms a filtrate column, and simultaneously therewith lowering the level of the mixture in a second group of said filter units with respect to the level of the filtrate columns thereof by producing a downward movement of the greater portion of the mixture which is above the bottoms of the filtrate columns thereof, thereby producing a reverse flow of the filtrate through the filtering media of said second group which discharges the solids accumulated on said media into the mixture and thickens the same, and periodically reversing said filtration and cleansing periods with respect to said groups of filtering units whereby to cause substantially continuous filtration in one or more of said filter units.

In testimony whereof I affix my signature.

ALBERT LEGRAND GENTER.